US008679699B2

(12) United States Patent
Kwon et al.

(10) Patent No.: US 8,679,699 B2
(45) Date of Patent: Mar. 25, 2014

(54) MEMBRANE ELECTRODE ASSEMBLY FOR FUEL CELL AND FUEL CELL EMPLOYING THE SAME

(75) Inventors: Kyung-jung Kwon, Yongin-si (KR); Duck-young Yoo, Yongin-si (KR); Tae-young Kim, Yongin-si (KR); Suk-gi Hong, Yongin-si (KR)

(73) Assignee: Samsung SDI Co., Ltd, Suwon-si, Gyeonggi-do (KR)

(*) Notice: Subject to any disclaimer, the term of this patent is extended or adjusted under 35 U.S.C. 154(b) by 2026 days.

(21) Appl. No.: 11/765,056

(22) Filed: Jun. 19, 2007

(65) Prior Publication Data
US 2008/0050633 A1 Feb. 28, 2008

(30) Foreign Application Priority Data

Aug. 22, 2006 (KR) .................. 10-2006-0079469

(51) Int. Cl.
*H01M 8/10* (2006.01)

(52) U.S. Cl.
USPC .......................... 429/492; 429/483

(58) Field of Classification Search
USPC .................... 429/33, 40, 492, 483
See application file for complete search history.

(56) References Cited

U.S. PATENT DOCUMENTS

| 5,098,985 | A | 3/1992 | Harris et al. | |
|---|---|---|---|---|
| 5,410,012 | A | 4/1995 | Connell et al. | |
| 5,525,436 | A | 6/1996 | Savinell et al. | |
| 5,637,670 | A | 6/1997 | Connell et al. | |
| 5,945,233 | A * | 8/1999 | Onorato et al. | 429/33 |
| 6,042,968 | A | 3/2000 | Onorato et al. | |
| 6,482,946 | B1 | 11/2002 | Dettloff et al. | |
| 6,620,905 | B1 | 9/2003 | Musa | |
| 7,157,509 | B2 | 1/2007 | Li et al. | |
| 7,371,480 | B2 | 5/2008 | Ono et al. | |
| 7,388,035 | B2 * | 6/2008 | Kim et al. | 521/27 |
| 2002/0127474 | A1 | 9/2002 | Fleischer et al. | |
| 2002/0164516 | A1 | 11/2002 | Hasegawa et al. | |
| 2003/0190516 | A1 | 10/2003 | Tanno | |
| 2004/0005493 | A1 | 1/2004 | Tanno | |
| 2004/0028976 | A1 | 2/2004 | Cabasso et al. | |
| 2004/0074651 | A1 | 4/2004 | Christensen et al. | |
| 2004/0206953 | A1 | 10/2004 | Morena et al. | |
| 2004/0231143 | A1 | 11/2004 | Visco et al. | |
| 2004/0241522 | A1 | 12/2004 | Ono et al. | |
| 2004/0261660 | A1 | 12/2004 | Li et al. | |
| 2005/0074651 | A1 | 4/2005 | Kidai et al. | |
| 2005/0084728 | A1 | 4/2005 | Kim et al. | |
| 2005/0089744 | A1 | 4/2005 | Kim et al. | |
| 2005/0130006 | A1 | 6/2005 | Hoshi et al. | |
| 2005/0142413 | A1 | 6/2005 | Kimura et al. | |
| 2005/0247908 | A1 | 11/2005 | Keller et al. | |
| 2006/0078774 | A1 | 4/2006 | Uensal et al. | |
| 2007/0020507 | A1 | 1/2007 | Kim et al. | |
| 2007/0184323 | A1 | 8/2007 | Lee et al. | |
| 2007/0200994 | A1 | 8/2007 | Yanagisawa | |
| 2007/0275285 | A1 | 11/2007 | Choi et al. | |
| 2008/0020264 | A1 | 1/2008 | Sun et al. | |
| 2008/0045688 | A1 | 2/2008 | Lin et al. | |
| 2008/0118817 | A1 | 5/2008 | Lee et al. | |
| 2008/0145743 | A1 | 6/2008 | Choi et al. | |
| 2009/0075147 | A1 | 3/2009 | Kitamura et al. | |

FOREIGN PATENT DOCUMENTS

| CN | 101220153 | 7/2008 |
|---|---|---|
| EP | 1 247 844 | 10/2002 |
| EP | 1 247 884 | 10/2002 |
| EP | 1 253 661 | 10/2002 |
| EP | 1 760 110 | 3/2007 |
| EP | 1 881 549 | 1/2008 |
| JP | 5-283082 | 10/1993 |
| JP | 10-25343 | 1/1998 |
| JP | 11-503262 | 3/1999 |
| JP | 11-97011 | 4/1999 |
| JP | 2001-270891 | 10/2001 |
| JP | 2002-260682 | 9/2002 |
| JP | 2003-12747 | 1/2003 |
| JP | 2003-12924 | 1/2003 |
| JP | 2003-286320 | 10/2003 |
| JP | 2004-43547 | 2/2004 |
| JP | 2004-103494 | 4/2004 |
| JP | 2004-149779 | 5/2004 |

(Continued)

OTHER PUBLICATIONS

U.S. Appl. No. 11/765,033, filed Jun. 19, 2007, Hee-young Sun et al., Samsung SDI Co., Ltd.
U.S. Appl. No. 11/514,254, filed Sep. 1, 2006, Seongwoo Choi et al., Samsung Electronics Co., Ltd.
U.S. Appl. No. 11/514,831, filed Sep. 5, 2006, Myung-jin Lee et al., Samsung Electronics Co., Ltd.
U.S. Appl. No. 11/743,778, filed May 2, 2007, Seongwoo Choi et al., Samsung Electronics Co., Ltd.
U.S. Appl. No. 11/856,350, filed Sep. 17, 2007, Seongwoo Choi et al., Samsung Electronics Co., Ltd.
U.S. Appl. No. 12/247,338, filed Oct. 8, 2008, Seongwoo-Choi et al., Samsung Electronics Co., Ltd.

(Continued)

*Primary Examiner* — Patrick Ryan
*Assistant Examiner* — Julian Anthony
(74) *Attorney, Agent, or Firm* — Lee & Morse, P.C.

(57) ABSTRACT

A membrane electrode assembly for a fuel cell and a fuel cell employing the same. The membrane electrode assembly includes: a cathode; an anode; and a polymer electrolyte membrane that is interposed between the cathode and the anode, and comprises a proton conductive polymer that is doped with acid to a doping level of less than 200 mole %. The membrane electrode assembly for the fuel cell exhibits an improved efficiency of performance when acid is doped in the polymer electrolyte membrane at a doping level of less than 200 mole. In addition, the performance of the fuel cell can be optimized by separately adjusting the amount of acid doped in the cathode and anode. The fuel cell employing the membrane electrode assembly can be operated at a high temperature in a dry environment and exhibits an improved power generating performance.

16 Claims, 2 Drawing Sheets

(56) References Cited

FOREIGN PATENT DOCUMENTS

| JP | 2004-179514 | 6/2004 |
|---|---|---|
| JP | 2005-41936 | 2/2005 |
| JP | 2005-82690 | 3/2005 |
| JP | 2005-283082 | 10/2005 |
| JP | 2006-339065 | 12/2006 |
| KR | 10-2006-0011831 | 2/2006 |
| KR | 2006-55291 | 5/2006 |
| KR | 10-2007-0025626 | 3/2007 |
| KR | 10-2007-0025627 | 3/2007 |
| KR | 10-2007-0102579 | 10/2007 |
| WO | WO 96/13872 | 5/1996 |
| WO | WO 02/14334 | 2/2002 |
| WO | WO 02/057279 | 7/2002 |
| WO | WO 03/072638 | 9/2003 |
| WO | WO 2004/009708 | 1/2004 |
| WO | WO 2004/101509 | 11/2004 |
| WO | WO 2005/000955 | 1/2005 |
| WO | WO 2006/132207 | 12/2006 |

OTHER PUBLICATIONS

U.S. Appl. No. 12/208,664, filed Sep. 11, 2008, Seongwoo Choi et al., Samsung Electronics Co., Ltd.
U.S. Appl. No. 12/262,854, filed Oct. 31, 2008, Seongwoo-Choi et al., Samsung Electronics Co., Ltd.
U.S. Appl. No. 11/947,011, filed Nov. 29, 2007, Seongwoo Choi et al., Samsung Electronics Co., Ltd.
U.S. Appl. No. 12/266,039, filed Nov. 6, 2008, Seongwoo Choi et al., Samsung Electronics Co., Ltd.
U.S. Appl. No. 12/208,492, filed Sep. 11, 2008, Seongwoo Choi et al., Samsung Electronics Co., Ltd.
B. Antalek. "Using Pulsed Gradient Spin Echo NMR for Chemical Mixture Analysis: How to Obtain Optimum Results.", Concepts in Magnetic Resonance (2002) vol. 14(4), pp. 225-258.
S. Viel et al. "Diffusion-Ordered NMR Spectroscopy: A Versatile Tool for the Molecular Weight Determination of Uncharged Polysaccharides.", Biomacromolecules (2003) vol. 4, pp. 1843-1847.
D. A. Jayawickrama et al. "Polymer additives mixture analysis using pulsed-field gradient NMR spectroscopy.", Magn.Reson. Chem (1998), vol. 36, pp. 755-760.
K. Nishinari et al. "Soulution Properties of Pullulan.", Macromolecules (1991) vol. 24, pp. 5590-5593.
L.C. Van Gorkom et al. "Analysis of DOSY and GPC-NMR Experiments on Polymers by Multivariate Curve Resolution.", Journal of Magnetic Resonance (1998) vol. 130, pp. 125-130.
A. Chen et al. "Determination of Molecular Weight Distributions for Polymers by Diffusion-Ordered NMR.", J. Am. Chem. Soc. (1995) vol. 117, pp. 7965-7970.
Hajime Kimura et al. "Epoxy Resin Cured by Bisphenol A Based Benzoxazine.", Journal of Applied Polymer Science (1998), vol. 68, pp. 1903-1910.
Schuster, Martin F.H., et al., "Anhydrous Proton-Conducting Polymers", Annu. Rev. Mater. Res., vol. 33, 2003, pp. 233-261.
Yamada, M. et al., "Anhydrous proton conducting polymer electrolytes based on poly(vinylphosphonic acid)-heterocyclic composite material", Polymer, vol. 46, No. 9, 2005, pp. 2986-2992.
Pu, H., et al., "Proton Transport in Polybenzimidazole Blended with $H_3PO_4$ or $H_2SO_4$", J. Polymer Science, Part B: Polymer Physics, vol. 40, 2002, pp. 663-669.
Kim, Hyoung-Juhn et al. *Polybenzimidazoles for High Temperature Fuel Cell Application*. Macromol. Rapid Commun. 2004, vol. 25, pp. 1410-1413.
Ueda, Mitsuru et al. *Poly(benzimidazole) Synthesis by Direct Reaction of Methoxyphthalic Acids and Tetramine*. J. Poly. Sci. Part A: Polym. Chem, 27 pp. 2815-2818 (1989).
Choi et al., "Synthesis, characterization and thermal degradation of functional benzoxazine monomers and polymers containing phenylphosphine oxide", Polymer Degradation and Stability, vol. 91, No. 5, May 1, 2006, pp. 1166-1178.
Low, Hong Yee, et al. "Structural Effects of Phenols on the Thermal and Thermo-oxidative Degradation of Polybenzoxazines". Polymer, vol. 40, No. 15. Jul. 1999. pp. 4365-4376.
Kim, H.J., et al. "Synthesis and Thermal Characterization of Polybenzoxazines Based On Acetylene-functional Monomers". Polymer, vol. 40, No. 23. Nov. 1999. pp. 6565-6573.
Shen, Shyan Bob, et al. "Synthesis and Characterization of Polyfunctional Naphthoxazines and Related Polymers". Journal of Applied Polymer Science vol. 61, No. 9. 1996, pp. 1595-1605.
Lin et al., "Synthesis and Properties of Flame-Retardant Benzoxazines by Three Approaches", Journal of Polymer Science, Part A: Polymer Chemistry, vol. 44, 2006, pp. 3454-3468.
Hirai et al., "Air-Induced *anti*-Markovnikov Addition of Secondary Phosphine Oxides and H-Phosphinates to Alkenes", National Institute of Advanced Industrial Science and Technology, Organic Letters 2007, vol. 9, No. 1, pp. 53-55.
Beletskaya et al., "Arylation of 6*H*-Dibenzo[c,e][1,2$\lambda^5$]oxaphosphinine 6-Oxide", Russian Journal of Organic Chemistry, vol. 40, No. 12, 2004, pp. 1782-1786.
Yamada et al., "A Novel Synthesis of 6-Hydroxyalkyl- and 6-Hydroxy-aralkyl-6*H*-dibenz[*c,e*][1,2]oxaphosphorin 6-Oxides", vol. 27, 1990, pp. 845-850.
Human translation of JP 2003-286320, A. Takeichi et al., Oct. 2003.
Human translation of JP 2004-103494, Kimura et al., Apr. 2004.
Machine translation of JP 2004-149779, Sakaguchi et al., May 2004.
European Search Report issued in European Patent Application No. 06254551.2-2115 on Nov. 21, 2006.
European Office Action issued in corresponding European Patent Application No. 07250814.6 on Oct. 30, 2007.
European Search Report issued in European Patent Application No. 08104319.2 on Oct. 13, 2008.
European Search Report issued in European Patent Application No. 08157494.9 on Nov. 24, 2008.
European Office Action issued in corresponding EP Application No. 08164095.5 on Dec. 4, 2008.
European Search Report issued in European Patent Application No. 08164096.3 on Jan. 20, 2009.
European Search Report issued in European Patent Application No. 08166328.8 on Jan. 22, 2009.
European Search Report issued in European Patent Application No. 08168081.1 on Jan. 28, 2009.
Extended European Search Report issued in European Patent Application No. 08168032.4 on Feb. 3, 2009.
European Search Report issued in European Patent Application No. 08168404.5 on Feb. 10, 2009.
Extended European Search Report issued in European Patent Application No. 08168404.5 on Apr. 23, 2009.
US Office Action issued in corresponding U.S. Appl. No. 11/947,011 on Jun. 22, 2009.
US Office Action issued in corresponding U.S. Appl. No. 11/947,011 on Jan. 15, 2010.
US Office Action issued in corresponding U.S. Appl. No. 11/947,011 on Mar. 30, 2010.
US Office Action issued in corresponding U.S. Appl. No. 11/514,254 on Jan. 8, 2010.
US Office Action issued in corresponding U.S. Appl. No. 11/514,254 on May 6, 2010.
US Office Action issued in corresponding U.S. Appl. No. 11/765,033 on Sep. 8, 2009.
US Office Action issued in corresponding U.S. Appl. No. 11/765,033 on Jun. 17, 2010.
US Office Action issued in corresponding U.S. Appl. No. 11/743,778 on Sep. 3, 2009.
US Office Action issued in corresponding U.S. Appl. No. 11/743,778 on Feb. 19, 2010.

* cited by examiner

MEMBRANE ELECTRODE ASSEMBLY FOR FUEL CELL AND FUEL CELL EMPLOYING THE SAME

CROSS-REFERENCE TO RELATED APPLICATIONS

This application claims the benefit of Korean Application No. 2006-79469, filed Aug. 22, 2006, in the Korean Intellectual Property Office, the disclosure of which is incorporated herein by reference.

BACKGROUND OF THE INVENTION

1. Field of the Invention

Aspects of the present invention relate to a membrane electrode assembly for a fuel cell as well as a fuel cell employing the same; and more particularly, to a membrane electrode assembly for a fuel cell in which power generating performance is improved by adjusting the doping level of acid in a polymer electrolyte membrane, as well as a fuel cell using the same.

2. Description of the Related Art

Ion conductors, through which ions can move when voltage is applied, are widely used in electrochemical devices, such as batteries, electrochemical sensors, and the like.

For example, proton conductors, which have stable proton conductivity in a dry environment (non-humidified or a relative humidity of 50% or less) at an operating temperature of 100 to 300° C., are preferably used in fuel cells in terms of power generating efficiency, system efficiency, and long-term durability of the components of the electrochemical devices.

The development of the conventional solid polymer fuel cell has been reviewed, considering the requirements. However, a solid polymer fuel cell containing a perfluoro carbon sulfonic acid membrane as a polymer electrolyte membrane cannot generate sufficient electricity in a dry environment (non-humidified or a relative humidity of 50% or less) at an operating temperature of 100 to 300° C.

In addition, there are fuel cells using a polymer electrolyte membrane containing a proton conducting agent, a silica dispersing membrane, an inorganic-organic composite membrane, a grafted membrane doped with phosphoric acid, or an ionic liquid composite membrane. Also, U.S. Pat. No. 5,525,436 discloses a solid polymer electrolyte membrane composed of polybenzimidazole (PBI) doped with a strong acid, such as phosphoric acid.

The polymer of the electrolyte membrane described in U.S. Pat. No. 5,525,436 is doped with about 350 mole % of phosphoric acid in order to obtain high proton conductivity, while the electrodes are not separately doped with an acid. When electrodes of the membrane electrode assembly employing the polymer electrolyte membrane are doped with more acid, the polymer electrolyte membrane is decomposed by the excess phosphoric acid so that crossover of reaction gases occurs.

Furthermore, a polymer electrolyte membrane doped with about 350 mole % of phosphoric acid includes excess phosphoric acid even taking into account the fact that a portion of the phosphoric acid contributes to proton conductivity of the polymer electrolyte membrane, and the excess phosphoric acid spreads to the electrodes and is doped into the electrodes so that the doping amount of phosphoric acid in the electrodes cannot be adjusted precisely.

SUMMARY OF THE INVENTION

Aspects of the present invention provide a membrane electrode assembly for a fuel cell in which proton conductivity is improved so that power generating performance is improved in a dry environment at a high temperature, as well as a fuel cell employing the same.

Additional aspects and/or advantages of the invention will be set forth in part in the description which follows and, in part, will be obvious from the description, or may be learned by practice of the invention.

One aspect of the present invention provides a membrane electrode assembly for a fuel cell comprising: a cathode; an anode; and a polymer electrolyte membrane that is interposed between the cathode and the anode, wherein a proton conductive polymer is doped with acid at a doping level of less than 200 mole %.

Another aspect of the present invention provides a fuel cell employing the membrane electrode assembly.

BRIEF DESCRIPTION OF THE DRAWINGS

These and/or other aspects and advantages of the invention will become more apparent and more readily appreciated from the following description of the embodiments, taken in conjunction with the accompanying drawings of which.

DETAILED DESCRIPTION OF THE EMBODIMENTS

Figure 1:
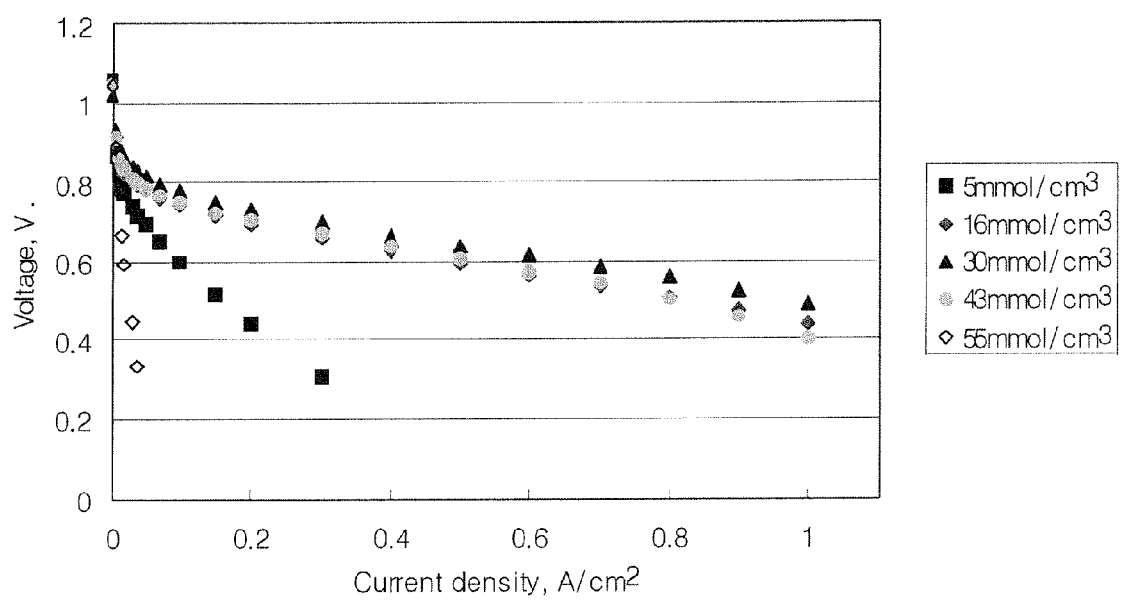
FIG. 1 is a graph of current density for a fuel cell with respect to voltage and the impregnation amount of phosphoric acid in a cathode, in a fuel cell manufactured using Example 1 of the present invention when the concentration of phosphoric acid in the anode is 10 mmol/cm$^3$.

Reference will now be made in detail to the present embodiments of the present invention, supported by experimental information illustrated in the accompanying drawings. The embodiments are described below in order to explain the present invention, including reference to the figures.

In a membrane electrode assembly for a fuel cell according to an embodiment of the present invention, fuel cell performance is optimized by adjusting the doping level of acid in a polymer electrolyte membrane to less than 200 mole %. When the doping level of acid in the polymer electrolyte membrane is greater than 200 mole %, the inside and surfaces of the polymer electrolyte membrane include excess amounts of phosphoric acid, even taking into account the portion of the phosphoric acid that contributes to proton conductivity of the polymer electrolyte membrane, and the excess phosphoric acid spreads to the electrodes and is doped into the electrodes so that the doping level of phosphoric acid in the electrodes cannot be adjusted precisely.

The term "membrane electrode assembly (MEA)" used in the present invention denotes a structure in which electrodes that comprise a catalyst layer and a diffusion layer are stacked on each of the surfaces of a polymer electrolyte membrane.

The doping level of acid doped in the polymer electrolyte membrane may be 50-200 mole %, and preferably 100-200 mole %.

In addition, in one embodiment of the present invention, the total amount of acid doped into the electrodes (including the cathode and the anode) is adjusted to be within a range of 15-80 mmol/cm$^3$. Here, the acid doping concentration per unit volume of the catalyst layer of the electrodes represents the minimum/maximum doping amounts for the two electrodes.

When the total doping amount of acid is less than 15 mmol/cm$^3$, the amount of acid necessary to optimize fuel cell performance does not exist in the catalyst layer of the electrode. When the total doping amount of acid is greater than 80 mmol/cm$^3$, the acid blocks most of the pores inside of the catalyst layers of the electrodes so that reaction gases can not be made to flow into the catalyst layers.

In the membrane electrode assembly according to an embodiment of the present invention, the doping amount of acid in the cathode is more preferably 10-50 mmol/cm$^3$, and the doping amount of acid in the anode is more preferably 5-30 mmol/cm$^3$.

Examples of the acids used in this embodiment include phosphoric acid, C1-C10 alkyl phosphonic acid or the like. The C1-C10 alkyl phosphonic acid can be ethyl phosphonic acid.

The concentration of the acid as added is not particularly limited. However, when phosphoric acid is used, 85 weight % of an aqueous acid solution is typically used. In addition, phosphoric acid is doped into the polymer electrolyte membrane at temperatures from ambient to 60° C. for a period of time within a range of 0.5-2 hours, and phosphoric acid is doped into the electrodes using an appropriate amount of the acid and then the electrodes doped with the acid are dried at 120° C. for two hours.

The definition of acid doping level and the units thereof, "mole %" and "mmol/cm$^3$" in the current embodiment of the present invention will be described.

The level or amount of acid doped into the polymer electrolyte membrane is the initial amount of the acid existing in the polymer electrolyte membrane before a manufactured fuel cell is operated. The doping level or amount of acid in an electrode is the initial amount of the acid existing in the electrode before the manufactured fuel cell is operated. The doping amount of the acid in the polymer electrolyte membrane is represented by "mole %". For example, "200 mole %" represents the case where a proton conductivity resin is doped with 2 mole of acid per 1 mole of a repeating unit of the proton conductivity resin. A doping amount "mmol/cm$^3$" of acid in the electrode is the concentration in moles of the acid existing in a unit volume of the catalyst layer of the electrode.

In the current embodiment, the amount of acid in the polymer electrolyte membrane and electrode can be analyzed by an acid-base titration method after a certain area of an MEA is sampled. The acid within the sampled area of the MEA is extracted in water, and then the extracted solution is acid-base titrated using bases such as NaOH, etc., and thus the amount of the acid in the extracted solution can be determined.

The polymer electrolyte membrane of the current embodiment of the present invention is formed from three components. One component is a cross-linked polybenzoxazine-based compound resulting from a polymerized resultant of at least one monomer selected from the group consisting of a first benzoxazine-based monomer represented by Formula 1 below, a second benzoxazine-based monomer represented by Formula 2 below, and a cross-linkable compound. The second component is a polymerized resultant of at least one monomer selected from a first benzoxazine-based monomer represented by Formula 1' below and a second benzoxazine-based monomer represented by Formula 2' below. The third component is a polymer of poly(2,5-benzimidazole) (ABPBI) having a repeating unit represented by Formula 3 below:

Formula (1) and Formula (1') have the structure,

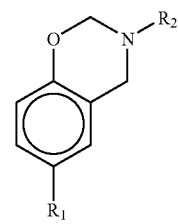

where $R_1$ is hydrogen, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C3-C20 heteroaryl group, a substituted or unsubstituted C4-C20 cycloalkyl group, a substituted or unsubstituted C2-C20 heterocyclic group, a halogen atom, a hydroxy group, or a cyano group. $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C3-C20 heteroaryl group, a substituted or unsubstituted C3-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group.

Formula (2) and Formula (2') have the structure

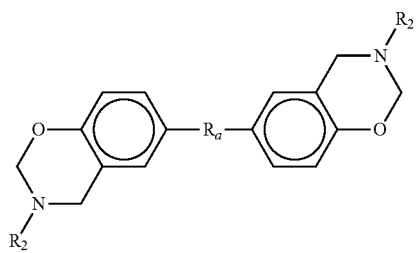

where $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C3-C20 heteroaryl group, a substituted or unsubstituted C3-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group. $R_3$ is selected from the group consisting of a substituted or unsubstituted C2-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C3-C20 heteroarylene group, —C(=O)—, and —SO$_2$—.

The compound, ABPBI, Formula (3), has the structure,

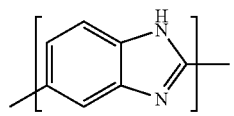

where 1 mol of the repeating unit of the ABPBI polymer represented by Formula 3 has a weight of 116 g/mol. The ABPBI forms a polymer, and the polymerization degree of the polymer is 10-100,000.

In the current embodiment of the present invention, besides ABPBI described above, any polybenzimidazole compounds containing a side chain of unsubstituted or substituted ethyl phosphonic acid, as represented by Formula (a) disclosed in Korean Patent Publication No. 2006-55291, can be used for forming the polymer electrolyte membrane.

In Formula 1 and 1', $R_1$ is preferably a C1-C10 alkyl group, an allyl group, a C6-C20 aryl group, a tert-butyl group, a C2-C10 alkenyl group, and a C2-C10 alkynyl group.

In Formulae 1, 1', 2 and 2', $R_2$ is preferably —$CH_2$—$CH$=$CH_2$, or one of the group represented by the formulae just below.

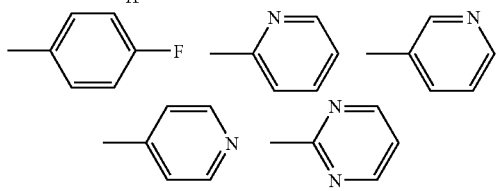

In Formula 2 and 2', $R_3$ is —C(CH3)2-, —C(CF3)2-, —C(=O)—, —SO2-, —CH2-, —C(CCl3)-, —CH(CH3)-, —CH(CF3)-C($CH_3$)$_2$—, —C($CF_3$)$_2$—, —C(=O)—, —$SO_2$—, —$CH_2$—, —C($CCl_3$)—, —CH($CH_3$)—, CH($CF_3$)—, or a group represented by the formula just below.

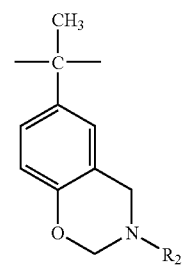

The compounds of Formula 1 and 1' may be compounds of Formulae 4 through 13 below:

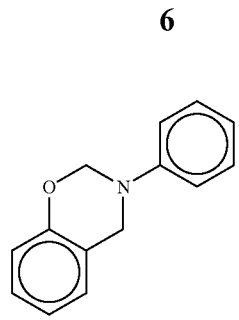

Formula (4)

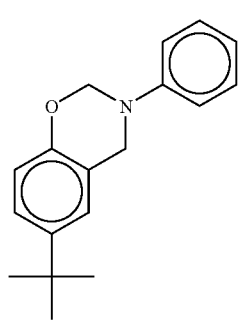

Formula (5)

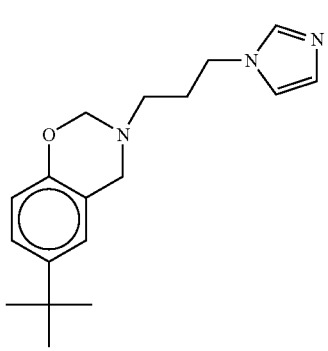

Formula (6)

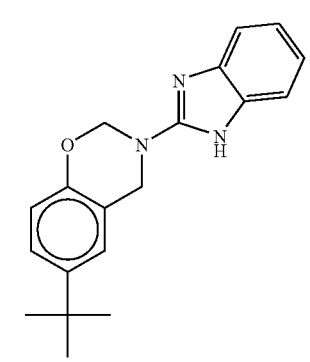

Formula (7)

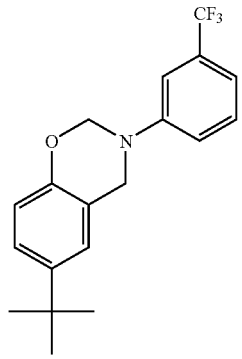

Formula (8)

Formula (9)
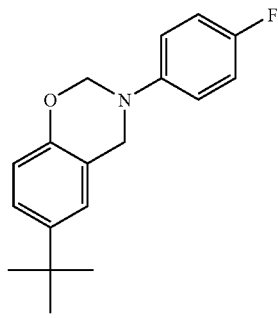
Formula (10)
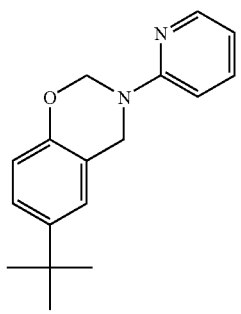
Formula (11)
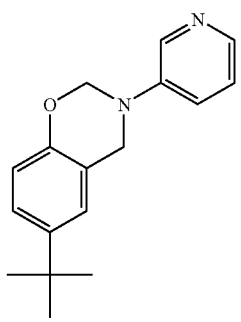
Formula (12)
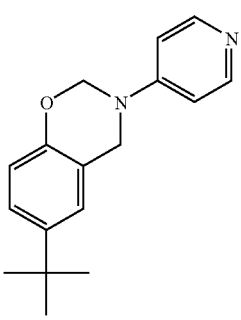
Formula (13)
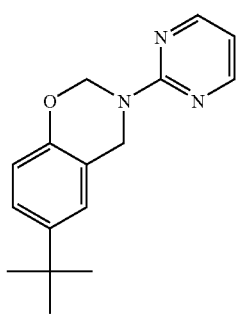
In addition, the compounds represented by Formula 2 and 2' may be the compounds of Formulae 14 through 18 represented below:
Formula (14)
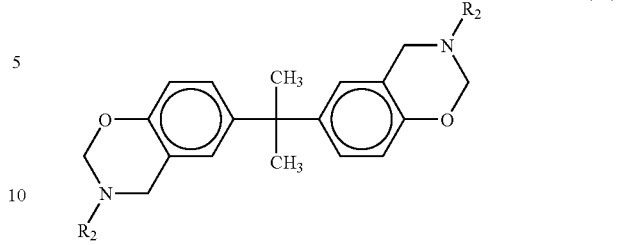
Formula (15)
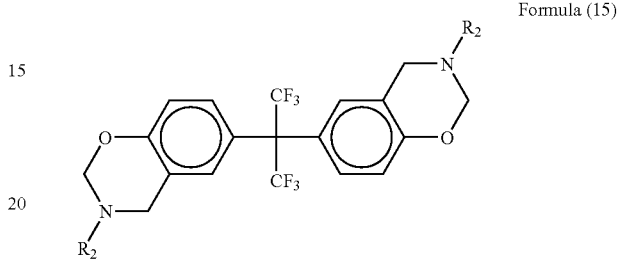
Formula (16)
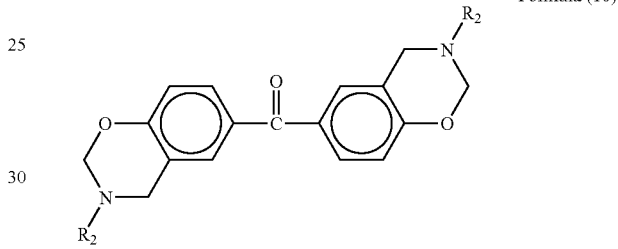
Formula (17)
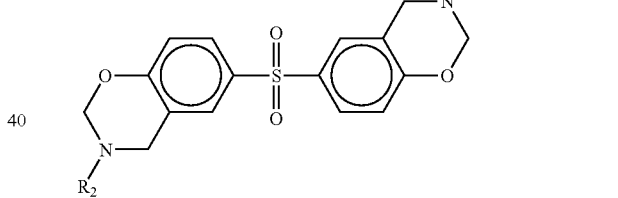
Formula (18)
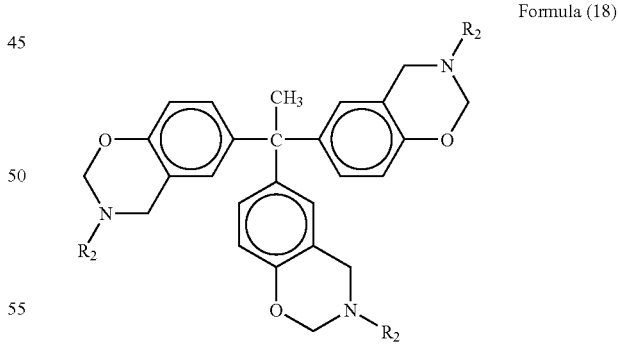
In Formulae 14 through 18, $R_2$ is —$CH_2$—$CH$=$CH_2$, or one of the groups represented by the formulae just below:
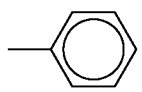 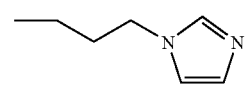

-continued

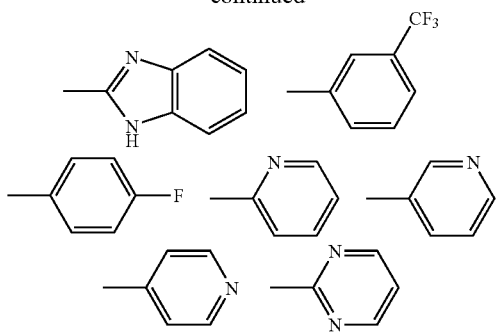

In the current embodiment of the present invention, the amount of the second benzoxazine-based monomer is 0.5-50% by weight of the first benzoxazine-based monomer.

The cross-linkable compound used in the current embodiment of the present invention can be any compound that can form a cross-linking bond with a benzoxazine-based monomer.

Non-restrictive examples of the cross-linkable compound include at least one compound selected from polybenzimidazole (PBI), polybenzothiazole, polybenzoxazole, and polyimide. The amount of the cross-linkable compound may be 5-95 parts % by weight of the total weight of the first benzoxazine-based monomer of Formula 1 and 1' and the second benzoxazine-based monomer of Formula 2 and 2'. When the amount of the cross-linkable compound is less than 5% by weight, phosphoric acid can not be impregnated (doped) into the polymer electrolyte membrane so that proton conductivity is reduced. When the amount of the cross-linkable compound is greater than 95% by weight, the cross-linked polymer breaks down into polyphosphoric acid in the presence of the excess phosphoric acid so that gases are transmitted.

Methods of preparing a polymer electrolyte membrane using polybenzimidazole as the cross-linkable compound will now be described.

In the first method, a benzoxazine-based monomer of Formula 1 and a benzoxazine-based monomer of Formula 2 are blended with a cross-linkable compound such as PBI. Then, the blended resultant is cured within a temperature range of 50-250° C., and preferably within a temperature range of 80-220° C. Subsequently, the resulting product is impregnated with a proton conductor such as acid to form a polymer electrolyte membrane.

In the second method, a membrane is formed using a mixture of a first benzoxazine-based monomer of Formula 1 and a second benzoxazine-based monomer of Formula 2, and the cross-linkable compound such as PBI.

The membrane can be formed using a tape casting method, or a conventional coating method. In this case, the coating method is casting the mixture using a doctor blade on a support. Here, the doctor blade has a gap of 250-500 μm.

When the method of casting the mixture using the doctor blade is used to form the membrane, after the cure reaction, the polymer electrolyte membrane must be removed from the support before any acid is impregnated into the membrane. This is done by immersing the support into distilled water having a temperature of 60-80° C.

The support can be any material that can support a polymer electrolyte membrane, such as a glass substrate, a polyimide film, etc. When the tape casting method is used, the tape-casted membrane is separated from a support such as polyethylene terephthalate before being cured, and then the membrane is place in an oven. Therefore, the subsequent process of removing the support is not required.

In addition, when a membrane is formed by the tape casting method using the mixture comprising the benzoxazine-based monomers and polybenzimidazole, a process of filtering the mixture can be further performed.

The formed membrane is heat-treated as a cure, and then the resulting product is impregnated with a proton conductor such as acid to form a polymer electrolyte membrane.

When the first benzoxazine-based monomer of Formula 1, the second benzoxazine-based monomer of Formula 2, and the cross-linkable compound such as PBI are cured, a cross-linked polybenzoxazine-based compound is obtained through an intercrosslinking reaction. That is, the first benzoxazine-based monomer and the second benzoxazine-based monomer are polymerized (cured) with the cross-linkable compound such as polybenzimidazole through thermal ring opening polymerization, thereby forming a polymer matrix. The polymerization reaction is performed by gradually adjusting the temperature, and maintaining the curing temperature for at least one hour in order to form the polymer matrix.

The temperature of the cure reaction is varied according to the first benzoxazine-based monomer, the second benzoxazine-based monomer and the cross-linkable compound used, but in any case, the cure reaction is performed within a range of 50-250° C. When the temperature of the cure reaction is less than 50° C., the cure reaction does not occur. When the temperature of the cure reaction is greater than 250° C., decomposition byproducts are obtained rather than the desired polymer matrix.

The time for performing the cure reaction depends on the temperature of the cure reaction. However, the cure reaction must be performed within the range of temperatures described above for at least one hour, but preferably for 8-20 hours.

The polymer made from the first benzoxazine-based monomer of Formula 1' and the second benzoxazine-based monomer of Formula 2' alone can be prepared in the same manner as the method of preparing the cross-linked polybenzoxazine-based compound, except that a cross-linking agent is not used.

The chemical and physical properties of the two polymers will now be described.

The cross-linked body of a polybenzoxazine-based compound obtained according to the current embodiment of the present invention has a thermosetting property that makes it insoluble in an organic solvent, acid, and base. Therefore, its molecular weight can not be measured by gel permeation chromatography (GPC) which is the most general method of obtaining information about the molecular weight of polymers.

A method of preparing the membrane electrode assembly (MEA) according to the current embodiment of the present invention will now be described.

The MEA is formed by disposing electrodes in which a catalyst layer is included on both surfaces of the polymer electrolyte membrane formed according to aspects of the present invention and having an appropriately controlled doping amount of acid and then joining these three elements together at a high temperature and high pressure, or coating catalyst metals in which an electrochemical catalyst reaction occurs onto the polymer electrolyte membrane and then joining these together with a fuel diffusion layer.

In this method, the joining is performed by heating the polymer electrolyte membrane until it softens and applying a pressure of 0.1-3 ton/cm², and particularly about 1 ton/cm².

Thereafter, a bipolar plate is installed on the MEA to complete a fuel cell. Here, the bipolar plate has grooves for fuel supply, and functions as a current collector.

When the MEA is prepared, the catalyst can be platinum alone, or an alloy or mixture of platinum and at least one metal selected from the group consisting of gold, palladium, rhodium, iridium, ruthenium, tin, molybdenum, cobalt, and chrome, which are optionally supported on a carrier.

Uses of a fuel cell made according to the current embodiment of the present invention are not particularly limited. However, according to an exemplary embodiment, the fuel cell can be used in any applications that call for a fuel cell that incorporates a polymer electrolyte membrane (PEM).

Hereinafter, the present invention will be described in further detail with reference to the following examples. These examples are for illustrative purposes only and are not intended to limit the scope of the present invention.

Example 1

Manufacture of a Fuel Cell

For the polymer electrolyte membrane, a polymer electrolyte membrane in which 158 mole % of ethyl phosphonic acid is doped into ABPBI (a weight of 1 mol of the repeating unit of ABPBI is 116 g/mol) having a repeating unit represented by Formula 3 below was used.

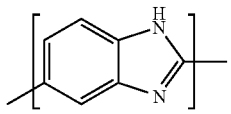

Formula (3)

ABPBI was formed by condensing 3,4-diaminobenzoic acid (DABA), which is a monomer, in a solution of polyphosphoric acid (PPA). DABA was dissolved in PPA at 150° C. under a nitrogen atmosphere, the resulting solution was heated to 200° C., then rapidly condensed in water at room temperature. A solution of the obtained ABPBI using methanesulfonic acid as a solvent was cast as a membrane using a doctor blade method. The methanesulfonic acid was evaporated at 200° C., and then the membrane was immersed in distilled water and separated to remove the support.

An electrode obtained by the following process was used as an anode (a fuel electrode).

0.025 g of polyvinylidene fluoride and a solvent of n-methyl-2-pyrrolidone (NMP) in an appropriate amount were mixed for every 1 g of a carbon-supported PtRu catalyst to prepare a slurry for forming the catalyst layer of the anode. Using a bar coater, the slurry was coated on carbon paper coated with a microporous carbon layer to obtain an undoped anode. An 85 weight % phosphoric acid solution was sprayed on the surface of the catalyst layer of the undoped anode using a spray gun to prepare an anode impregnated with 2-40 mmol/cm$^3$ of phosphoric acid. The catalyst layer of the anode had a thickness of about 50 μm and the supported amount of Pt was 1.4 mg/cm$^2$.

A slurry for forming a catalyst layer of a cathode was separately prepared by mixing 0.025 g of polyvinylidene fluoride and a solvent of NMP in an appropriate amount for every 1 g of a carbon-supported PtCo catalyst in a stirrer. Using a bar coater, the slurry was coated on carbon paper coated with a microporous carbon layer to obtain an undoped cathode (an oxygen electrode). An 85 weight % f phosphoric acid solution was sprayed on the surface of the catalyst layer of the obtained cathode using a spray gun to prepare a cathode impregnated with 5-55 mmol/cm$^3$ of phosphoric acid. The catalyst layer of the cathode had a thickness of about 50 μm and the supported amount of Pt was 2.0 mg/cm$^2$.

The polymer electrolyte membrane was interposed between the anode and the cathode to prepare the MEA, and a bipolar plate was installed on the MEA to complete a fuel cell.

Hydrogen (flow velocity: 100 cc/min) and air (250 cc/min) were made to flow to the anode and the cathode, respectively, at 150° C. and in a dry atmosphere for the polymer electrolyte membrane to generate power, and characteristics of the fuel cell were measured. Here, since a polymer electrolyte membrane doped with phosphoric acid was used, the performance of the fuel cell improved as time went by. The fuel cell was aged until its operating voltage reached its highest point and then a final evaluation was conducted. Results for current density as a function of voltage and doping concentration of phosphoric acid in a cathode, when 10 mmol/cm$^3$ of phosphoric acid is doped in an anode, are shown in FIG. 1.

Referring to FIG. 1, it can be seen that the characteristic of current density with respect to voltage improves as the impregnation (doping) concentration of phosphoric acid in a cathode is increased within a range of 10-50 mmol/cm$^3$ of phosphoric acid in the cathode, in the fuel cell according to Example 1.

Figure 2:
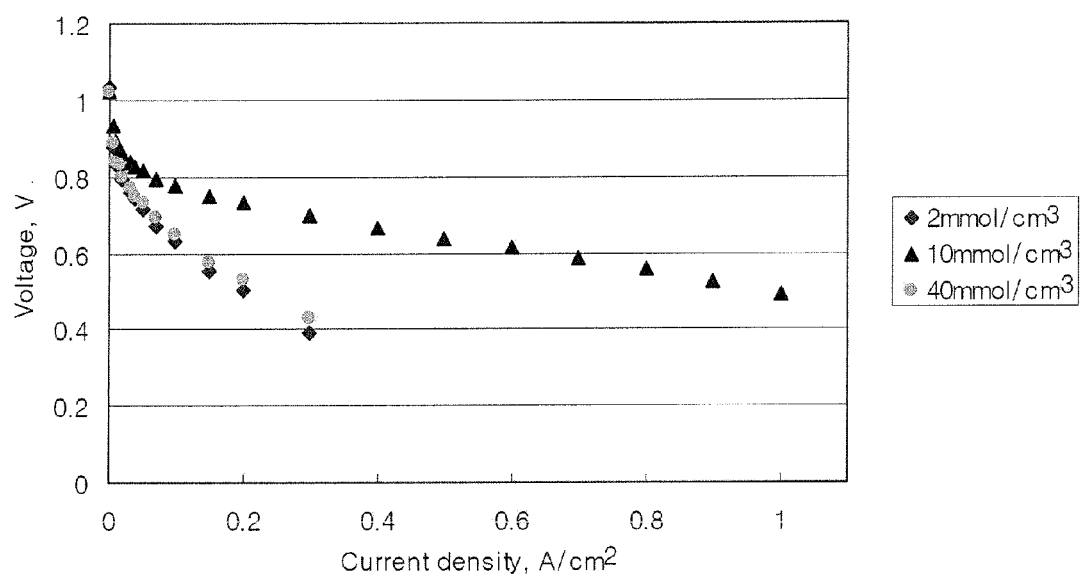
FIG. 2 is a graph of current density for a fuel cell with respect to voltage and the impregnation amount of phosphoric acid in an anode when 30 mmol/cm$^3$ of phosphoric acid is doped in a cathode, in a fuel cell manufactured using Example 1 of the present invention.

When 30 mmol/cm$^3$ of phosphoric acid is doped into a cathode, the results according to the doping amount of phosphoric acid in an anode are shown in FIG. 2.

Referring to FIG. 2, it can be seen that the characteristic of current density with respect to voltage improves as the impregnation (doping) concentration of phosphoric acid in the anode is increased within a range of 5-30 mmol/cm$^3$ of phosphoric acid in an anode, in the fuel cell according to Example 1.

The membrane electrode assembly for a fuel cell according to one aspect of the present invention has an improved efficiency of when the doping amount of acid in a polymer electrolyte membrane is an amount of less than 200 mole %.

In addition, the performance of the fuel cell can be optimized by controlling the amount of acid doped in the polymer electrolyte membrane to less than 200 mole % and adjusting the amount of acid doped in the electrodes. The fuel cell employing the same can be operated at a high temperature in a dry environment and exhibit an improved power generating performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A membrane electrode assembly comprising:
   a cathode;
   an anode; and
   a polymer electrolyte membrane that is interposed between the cathode and the anode, comprising a proton conductive polymer that is doped with acid at a doping level of less than 200 mole %.

2. The membrane electrode assembly of claim 1, wherein the cathode and the anode are doped with acid, and the total amount of acid contained in the cathode and the anode is 15-80 mmol/cm$^3$.

3. The membrane electrode assembly of claim 2, wherein the doping amount of acid in the cathode is 10-50 mmol/cm$^3$.

4. The membrane electrode assembly of claim 2, wherein the doping amount of acid in the anode is 5-30 mmol/cm$^3$.

5. The membrane electrode assembly of claim 1, wherein the acid is at least one selected from the group consisting of phosphoric acid and C1-C10 alkyl phosphonic acid.

6. The membrane electrode assembly of claim 1, wherein the polymer electrolyte membrane comprises:
at least one polymer selected from the group consisting of:
(A) poly(2,5-benzimidazole);
(B) a cross-linked polybenzoxazine-based compound resulting from a polymerized resultant consisting of at least one monomer selected from a first benzoxazine-based monomer represented by Formula 1 below, a second benzoxazine-based monomer represented by Formula 2 below, and a cross-linkable compound; and
(C) a polymerized resultant consisting of a compound selected from a first benzoxazine-based monomer represented by Formula 1' below and a second benzoxazine-based monomer represented by Formula 2' below;

Formula (1) or Formula (1')

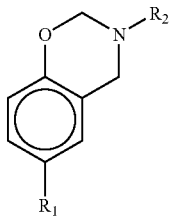

wherein R$_1$ is hydrogen, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C3-C20 heteroaryl group, a substituted or unsubstituted C4-C20 cycloalkyl group or a substituted or unsubstituted C2-C20 heterocyclic group, a halogen atom, a hydroxy group, or a cyano group;
wherein R$_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C3-C20 heteroaryl group, a substituted or unsubstituted C3-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group;

Formula (2) or Formula (2')

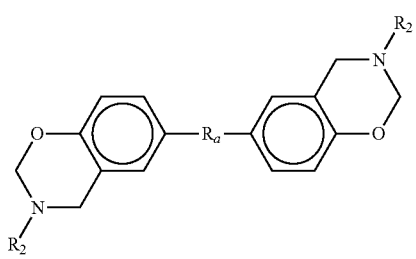

wherein R$_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C3-C20 heteroaryl group, a substituted or unsubstituted C3-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and
wherein R$_3$ is selected from the group consisting of a substituted or unsubstituted C2-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C3-C20 heteroarylene group, —C(=O)—, and —SO$_2$—.

7. The membrane electrode assembly of claim 6, wherein the amount of the second benzoxazine-based monomer is 0.5-50% by weight of the first benzoxazine-based monomer.

8. The membrane electrode assembly of claim 6, wherein R$_1$ of Formula 1 and 1' is selected from the group consisting of a C1-C10 alkyl group, an allyl group, a C6-C20 aryl group, a tert-butyl group, a C2-C10 alkenyl group, or a C2-C10 alkynyl group.

9. The membrane electrode assembly of claim 6, wherein R$_2$ of Formulae 1, 1', 2 and 2' is selected from the group consisting of —CH$_2$—CH=CH$_2$, or groups represented by the following formulae

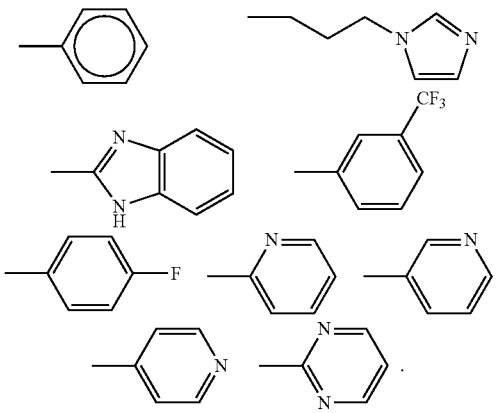

10. The membrane electrode assembly of claim 6, wherein R$_3$ of Formula 2 and 2' is selected from the group consisting of —C(CH$_3$)$_2$—, —C(CF$_3$)$_2$—, —C(=O)—, —SO$_2$—, —CH$_2$—, —C(CCl$_3$)—, —CH(CH$_3$)—, —CH(CF$_3$)— or the group represented by the following formula.

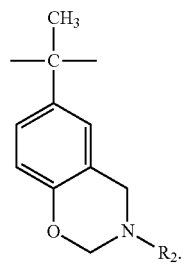

11. The membrane electrode assembly of claim 6, wherein the monomer of Formula 1 is selected from the group consisting of Formulae 4 through 13:

Formula (4)
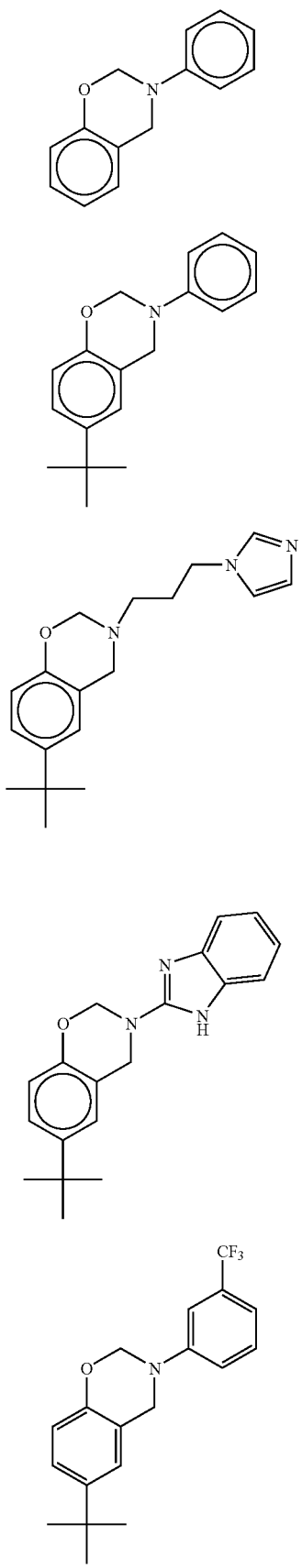
Formula (5)
Formula (6)
Formula (7)
Formula (8)
Formula (9)
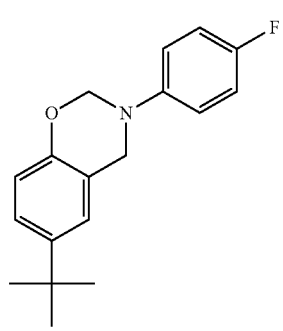
Formula (10)
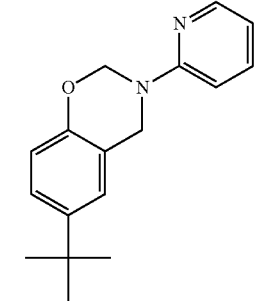
Formula (11)
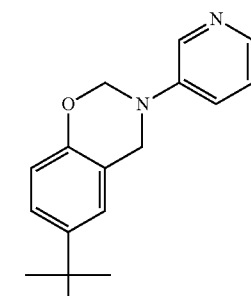
Formula (12)
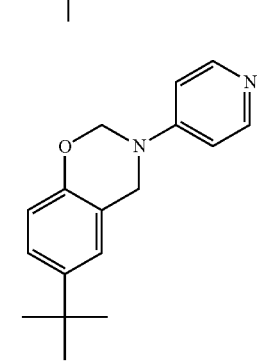
Formula (13)
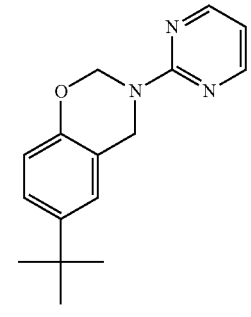

12. The membrane electrode assembly of claim 6, wherein the second benzoxazine-based monomer represented by Formula 2 is selected from the group consisting of Formulae 14 through 18 below:

Formula (14)
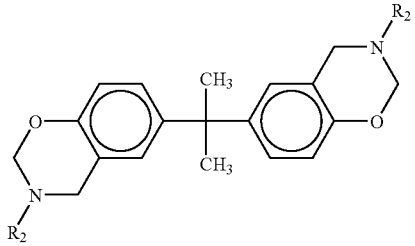

Formula (15)
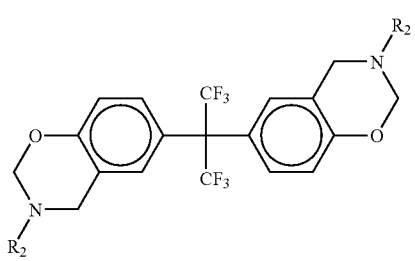

Formula (16)
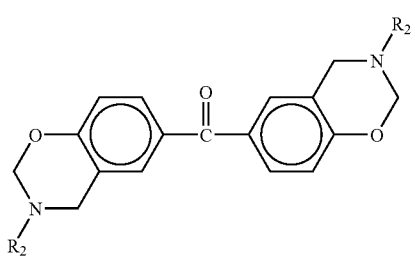

Formula (17)
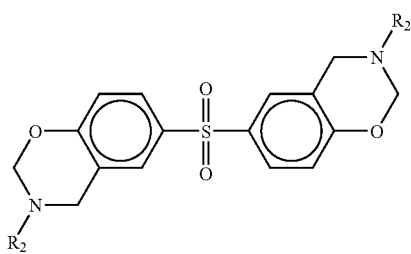

Formula (18)
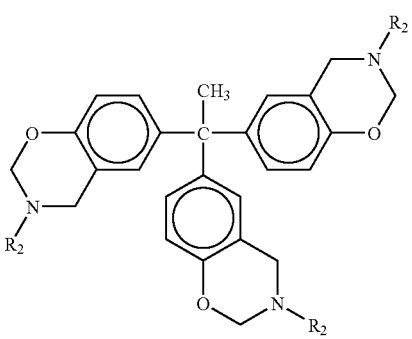

wherein $R_2$ is —$CH_2$—$CH$=$CH_2$, or groups represented by he following formulae:

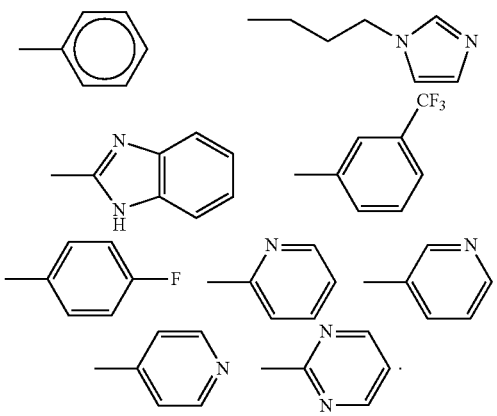

13. The membrane electrode assembly of claim 6, wherein the cross-linkable compound is at least one polymer selected from the group consisting of polybenzimidazole, polybenzothiazole, polybenzoxazole, and polyimide.

14. The membrane electrode assembly of claim 6, wherein the amount of the cross-linkable compound is 5-95% by weight of the total weight of the first benzoxazine-based monomer and the second benzoxazine-based monomer.

15. A fuel cell comprising the membrane electrode assembly according to claim 1.

16. The membrane electrode assembly of claim 1, wherein the doping level in the polymer electrolyte membrane is 50 to less than 200 mole %.

\* \* \* \* \*